3,067,089
POLYETHER-HALOGEN COMPOSITIONS
Alfred E. Winslow, Scott Depot, W. Va., assignor to Union Carbide Corporation, a corporation of New York
No Drawing. Filed Aug. 23, 1960, Ser. No. 51,297
7 Claims. (Cl. 167—17)

This invention relates to germicidal polyether-halogen compositions. In a particular aspect, this invention relates to resinous polyether-halogen compositions which provide the useful properties of molecular halogen.

It is a main object of this invention to provide plastic compositions which are biologically active.

It is another object of this invention to provide novel iodine- and bromine-containing compositions which retain the useful properties of the respective molecular halogens.

It is another object of this invention to provide aqueous solutions which contain a high concentration of available iodine.

Other objects and advantages of the present invention will become apparent to one skilled in the art from the accompanying description and disclosure.

One or more objects of the present invention are accomplished by the provision of biologically active compositions comprising (1) resinous poly(alkylene oxide) having an average molecular weight between about twenty thousand and ten million, and (2) between 5 and 300 percent by weight, based on the weight of poly(alkylene oxide), of halogen selected from the group consisting of iodine and bromine.

The molecular weight of the poly(alkylene oxide) component is further characterized as corresponding to reduced viscosity between about 0.5 and 100 in acetonitrile or other similar solvent. Molecular weight may be determined by standard methods such as ultracentrifuging, light dissymmetry or osmotic pressure. Reduced viscosity may be determined with the Ubbelhode, the Ostwald or equivalent viscometer in the temperature range between 20° C. and 30° C., using a resin concentration in solution sufficiently low to produce an approximate linear relationship between reduced viscosity and polymer concentration between infinite dilution and the concentration at which the reduced viscosity is determined. Reduced viscosity is defined by the expression:

$$I_r = \frac{T - T_0}{(T_0)(C)}$$

wherein T is the time required for a low concentrate polymer solution to pass through a standardized Ubbelhode viscometer; wherein $T_0$ is the time for the pure solvent to pass through the viscometer; and wherein C is the concentration of the solution.

Poly(alkylene oxide) with a reduced viscosity of about 1.0 or greater when measured at 30° C. at a concentration of 0.2 gram of polymer in 100 milliliters of acetonitrile can be made by a variety of processes. A number of catalysts can be used to effect the polymerization reaction. Among these are certain pure metal carbonates which contain about 0.1 percent by weight absorbed water and are preferably substantially free of non-absorbed water, such as calcium, strontium and barium carbonate. These carbonates are preferably used in the bulk polymerization of alkylene oxide at a concentration of about 0.3 to 3 percent by weight based on the weight of the alkylene oxide to be polymerized. The polymerization reaction is preferably carried out at a temperature in the range from 90° C. to 150° C. In making such high molecular weight polymers, it is desirable that high purity alkylene oxide be used. Water, oxygen and carbon dioxide are to be avoided as are aldehydes. The preferred poly(alkylene oxides) are those prepared by the polymerization of 1,2-alkylene oxide monomers containing between two and about four carbon atoms, e.g., ethylene oxide, propylene oxide and butylene oxide. Poly(ethylene oxide) resins having a molecular weight in the range between about forty-four thousand and nine million are eminently preferred in the practice of the present invention.

The biologically active compositions of the present invention contain about 5 to 300 weight percent of total halogen based on the weight of the poly(alkylene oxide) component. The halogen in the compositions is present both as unavailable halide atoms most of which are present as halide ions, and as available molecular halogen. The available halogen provides most of the useful biological activity provided by the present compositions. For most purposes, the available halogen is present in the compositions in a quantity between about 1 and 250 weight percent based on the weight of the poly(alkylene oxide) component.

By the term "available" halogen is meant halogen which is determinable by titration with thiosulfate. The term "molecular" halogen refers to the available halogen. The iodine and bromine halogen can be used as a mixture as well as alone in the preparation of the compositions. The halogen may be employed in the form of iodine bromide or iodine-tribromide, or as iodine monochloride, iodine trichloride and iodine pentachloride.

The available halogen in the compositions is believed to be loosely bound to the polyether oxygen atoms by a complexing or "association" mechanism. Support for the complex formation theory is indicated by the fact that poly(alkylene oxide) absorbs iodine from heptane solution. Complex formation is also indicated by substantial resistance of the iodine in the iodine-containing compositions to extraction by ether, and resistance to volatilization when the compositions are baked in open containers. In the case of the bromine-containing compositions, complex formation of bromine with the polyether oxygen atoms is indicated by absorption of substantial amounts of normally liquid bromine by the polyether resin to form a solid reaction product, and is further substantiated by composition vapor pressures which are considerably lower than expected for the amount of available bromine in the compositions.

The polyether-halogen compositions can be dissolved in solvents such as water, aqueous alcohol, chlorinated solvents, acetonitrile, benzene, acetic acid, and the like, as well as mixed solvents. The compositions can be mixed with additional halogen, or with other known biological chemicals in order to accomplish the advantages of two or more compositions with one formulation. Other components may be included in the compositions as desired such as inert fillers, plasticizers, extenders and binders.

In the poly(alkylene oxide)-iodine compositions the preferred weight of available iodine is between about 1 and 20 weight percent based on the weight of poly(alkylene oxide). In the poly(alkylene oxide)-bromine compositions existing in the solid state the preferred weight of available bromine is between about 1 and 17 weight percent based on the weight of poly(alkylene oxide). The poly(alkylene oxide)-bromine compositions which contain total bromine in an amount of about 50 weight percent and higher, based on the weight of poly(alkylene oxide), are liquid compositions. These liquid poly(alkylene oxide)-bromine compositions are readily dilutable with water and have a low bromine vapor pressure as compared to free bromine.

The poly(alkylene oxide)-iodine compositions can be conveniently prepared by blending the components as dry powders in a pebble mill. They can also be prepared by contacting the resinous poly(alkylene oxide) with iodine vapors. This can be accomplished by molding a mixture of the components in powder form, in addition to other procedures. They can also be prepared by mixing the components in a common solvent. A particularly useful method of preparing poly(alkylene oxide)-iodine compositions is by suspending finely powdered poly(alkylene oxide) in an iodine solution in heptane or other similar solvent.

The poly(alkylene oxide)-bromine compositions can be prepared by employing similar methods. It has been found that a particularly useful method of preparing poly(alkylene oxide)-bromine compositions is by contacting a moving bed of powdered poly(alkylene oxide) resin with bromine vapor.

Poly(alkylene oxide)-iodine compositions have high biological activity. One advantage of these compositions over plain iodine is that they provide higher concentrations of available iodine in aqueous solutions. Furthermore, such solutions give less staining and irritation to skin or open wounds, and less staining to clothing than do other forms of iodine such as alcoholic solutions.

The poly(alkylene oxide)-bromine compsitions are biologically active and their vapor pressures are only a small fraction of that of elemental bromine. For this reason, the poly(alkylene oxide)-bromine compositions in their use afford less corrosive and toxic effects than elemental bromine. Hence, the hazards normally associated with the handling of halogens in their elemental form are greatly reduced and enable the general public to safely use these compositions for germicidal, sanitary and cleaning purposes.

Granular poly(alkylene oxide)-bromine compositions can be molded into hard sheets or pellets of fair strength to further enhance handling convenience. The physical form of the poly(alkylene oxide)-bromine compositions and available bromine content are stable upon dry storage. The poly(alkylene oxide)-bromine compositions are useful as resin modifiers, flameproofing agents, deodorizers, bromination reagents, textile fiber treating agents, catalysts, light sensitizers, slime and odor control agents, and the like.

The solid resinous compositions of the present invention can be in the form of films, sheets or molded shapes. Many of these compositions have negligible vapor pressures and have useful plastic properties such as good tensile strength, flexibility, high elongation, and the ability to be cold drawn, and at the same time, their biological activity can be quickly and efficiently utilized by local or general contact with a solvent such as water. The resinous, high molecular weight poly(alkylene oxide)-iodine compositions of the present invention are superior to polymeric iodine compositions known heretofore in that the present compositions have greater tensile strength, elongation, flexibility and moldability, and have the ability to be formed into self-supporting free films.

The following examples will serve to illustrate specific embodiments of the invention.

Available iodine was determined by titration with sodium thiosulfate. Iodide ion was calculated by subtraction of available iodine from the total of available iodine plus iodide ion, this total being determined by titration of iodate produced by the steps of (1) reduction of available iodine with sodium bisulfite, and (2) oxidation with bromine water. Total iodine was determined by titration of iodate produced by oxidation of a Schöniger decomposition product with bromine water.

Total bromine was determined by the Carius method using nitric acid and silver nitrate at 250° C.; analysis for available bromine was performed by addition of potassium iodide followed by titration of liberated iodine.

EXAMPLE 1

This example illustrates the preparation of a polyether-iodine composition in solution phase.

40 grams of poly(ethylene oxide) (reduced viscosity of 3.4 at 20° C., 0.2 gram per 100 milliliters of acetonitrile) and 40 grams of elemental iodine were dissolved in a mixture of 1098 grams of acetone and 122 grams of water by mixing on can rolls. The product solution was evaporated to dryness in a forced draft oven at 100° C. The product (69.5 grams) was recovered as a soft reddish-brown wax.

A 1.015 gram sample was extracted for twenty-four hours with 100 grams of heptane in a container rotated on can rolls. The undissolved portion, after decantation of the liquid phase, weighed 1.009 grams after drying at 50° C. in a vacuum oven for eighteen hours. Iodine, under the same conditions, completely dissolved in heptane. Extraction of product samples with water and acetone by the same procedure dissolved 79 percent and 62.8 percent by weight of the product, respectively.

EXAMPLE 2

This example illustrates the preparation of a polyether-iodine composition in a two-phase system.

10 grams of poly(ethylene oxide) resin (reduced viscosity of 3.3 at 20° C., 0.20 gram per 100 milliliters of acetonitrile), which had been screened through a 35-mesh per inch standard screen, was mixed in a 16-ounce bottle with 323.5 grams of an 0.728 percent by weight iodine solution in heptane. Mixing was continued for eighteen hours by rotation of the bottle on can rolls. The solid product, after removal of the heptane by decantation and drying at 25° C. in a vacuum oven, was a black powder weighing 11.9 grams. The following analysis of the product is in percent by weight:

Available iodine _____ 9.97
Iodide ion _____ 6.79
Total iodine _____ 17.96

Heat stability of the polyether-iodine product was determined by observing weight losses upon heating one-gram samples in open aluminum weighing cups in a forced draft oven at 75° C. for eighteen hours. The following results are averages calculated from triplicate determinations:

WEIGHT LOSS, 75° C., OPEN CONTAINERS

| Time, minutes | Percent by weight |
|---|---|
| 5 | 1.03 |
| 10 | 1.64 |
| 20 | 2.27 |
| 30 | 2.40 |
| 50 | 3.19 |
| 80 | 3.51 |
| [1] 18 | 5.18 |

[1] Hours.

ANALYSIS OF HEPTANE-PREPARED IODINE-POLY(ETHYLENE OXIDE) BLEND, HEATED 18 HOURS AT 75° C., PERCENT BY WEIGHT

Available iodine _____ 6.63
Iodide ion _____ 6.87
Total iodine _____ 13.47

After eighteen hours' heat treatment at 75° C., in open containers, 71.1 percent by weight of the iodine absorbed was still present, and 35 percent was still present as available iodine.

EXAMPLE 3

A series of four poly(ethylene oxide)-iodine compositions containing 3 percent, 10 percent, 15 percent and 25 percent iodine by weight in the charge, respectively, were prepared by grinding the components in a one-quart pebble mill for six to seven hours. The dry charge in each case totalled 100 grams and contained the indicated amounts of powdered elementary iodine and −35 mesh poly(ethylene oxide) resin (reduced viscosity of 8.0 at 20° C., 0.2 gram per 100 milliliters of acetonitrile). One-gram samples of the four products were heated in aluminum weighing cups for twenty hours at 75° C. and weight loss was recorded.

Each of the residues remaining from the heat stability tests was dissolved in 50 grams of distilled water by agitating on can rolls. The control sample (no iodine) gave a cloudy, slightly viscous, nearly white solution. The iodine-containing samples were all light yellow in color and the amount of black undissolved solids which settled quickly upon standing ranged from a small amount to lesser amounts with decreasing iodine content.

POLY(ETHYLENE OXIDE)-IODINE PEBBLE-MILLED BLENDS

| Iodine charged, percent by weight | Appearance (fine powder) | Analytical results, percent by weight | | | Weight loss, 20 hrs., 75°C., percent by wt., open containers |
|---|---|---|---|---|---|
| | | Avail. iodine | Iodide ion | Total iodine | |
| None | | No iodine—Control | | | 0.7 |
| 3.0 | Light brown, no iodine odor. | 1.19 | 1.91 | 3.18 | 0.9 |
| 10.0 | Rust color, slight iodine odor. | 5.36 | 4.08 | 9.39 | 5.3 |
| 15.0 | Black, strong iodine odor. | 8.90 | 5.40 | 14.76 | 9.2 |
| 25.0 | ----do---- | 17.10 | 5.67 | 24.28 | 18.2 |

EXAMPLE 4

The four poly(ethylene oxide)-iodine compositions prepared in Example 3 were submitted to ether extraction. The extraction data was determined by rotating 2-gram product samples with 100 grams of diethyl ether in four-ounce bottles on can rolls for twenty-four hours. The insoluble residues after removal of the ether medium by decantation were dried for three days at room temperature in a vacuum oven. Iodine analyses were performed on the dry ether insoluble residues. Ether extraction of uncomplexed poly(ethylene oxide) removed only 0.5 percent of the weight by the same extraction procedure. Pertinent data are listed below in Tables I and II.

The data indicated that substantial resistance of the iodine in the compositions to ether extraction and to volatilization was obtained by intimate admixture of the iodine with poly(ethylene oxide), which demonstrated that more than a physical mixture was formed. These effects were accentuated by baking.

Table I 3.18% TOTAL IODINE IN ORIGINAL SAMPLE

| | Baking conditions | | | |
|---|---|---|---|---|
| | No bake (control) | 23 hrs., 75° C., open container | 1 hr., 100° C., closed container | 18 hrs., 150° C. closed container |
| Weight losses, weight percent based on original sample weight: | | | | |
| Baking | | 0.5 | 0.1 | 0.5 |
| Extraction | 5.5 | 2.2 | 4.8 | 3.3 |
| Analysis, percent by weight based on insoluble residue: | | | | |
| Available iodine | 0.61 | 0.51 | 1.23 | 1.23 |
| Iodide ion | 2.67 | 2.78 | 2.23 | 1.66 |
| Total iodine | 3.27 | 3.30 | 3.53 | 2.95 |

9.39% TOTAL IODINE IN ORIGINAL SAMPLE

| | | | | |
|---|---|---|---|---|
| Weight losses, weight percent based on original sample weight: | | | | |
| Baking | | 4.3 | 0.5 | 1.6 |
| Extraction | 8.5 | 1.0 | 6.3 | 1.5 |
| Analysis, percent by weight based on insoluble residue: | | | | |
| Available iodine | 3.66 | 2.22 | 4.01 | 4.84 |
| Iodide ion | 2.63 | 4.10 | 3.05 | 4.36 |
| Total iodine | 6.37 | 6.44 | 7.27 | 9.61 |

Table II 14.76% TOTAL IODINE IN ORIGINAL SAMPLE

| | Baking conditions | | | |
|---|---|---|---|---|
| | No bake (control) | 23 hrs., 75° C., open container | 1 hr., 100° C., closed container | 18 hrs., 150° C., closed container |
| Weight losses, weight percent based on original sample weight: | | | | |
| Baking | | 7.7 | 0.7 | 1.4 |
| Extraction | 11.8 | 0.5 | 8.4 | 3.4 |
| Analysis, percent by weight based on insoluble residue: | | | | |
| Available iodine | 4.79 | 4.59 | 4.55 | 8.04 |
| Iodide ion | 3.20 | 3.53 | 4.66 | 5.38 |
| Total iodine | 7.94 | 8.33 | 9.22 | 13.61 |

24.28% TOTAL IODINE IN ORIGINAL SAMPLE

| | | | | |
|---|---|---|---|---|
| Weight losses, weight percent based on original sample weight: | | | | |
| Baking | | 14.5 | 1.2 | 3.3 |
| Extraction | 17.8 | 0.5 | 12.0 | 17.6 |
| Analysis, percent by weight based on insoluble residue: | | | | |
| Available iodine | 8.28 | 6.85 | 8.70 | 15.66 |
| Iodide ion | 4.03 | 5.43 | 5.96 | 9.19 |
| Total iodine | 12.94 | 12.39 | 14.83 | 25.50 |

EXAMPLE 5

A poly(ethylene oxide)-iodine composition was prepared by grinding together in a pebble mill poly(ethylene oxide) (reduced viscosity of 7.5 at 20° C., 0.2 gram per 100 milliliters of acetonitrile) and 15 percent by weight of iodine of the charge. The components were ground for twenty-six hours.

A viscous solution containing some black suspended solids was prepared by dissolving 40 grams of the poly(ethylene oxide)-iodine composition in 760 grams of water. The viscosity of this 5 percent by weight solution of 3100 centipoises (Brookfield viscometer, 25° C., 2 r.p.m.) was caused to increase to 6200 centipoises when a sample was heated to a temperature of 90.5° C. with stirring for one-half hour and then allowed to cool. The Brookfield viscosity at the time of maximum temperature was 100 centipoises. The pH of the dark green viscous solution was 4.12 after cooling.

A poly(ethylene oxide) aqueous solution prepared from the same batch of resin used above, and prepared with the same concentration of resinous solution as was present in the poly(ethylene oxide)-iodine solution just described, was observed to have a solution viscosity of 11,000 centipoises determined under the same conditions.

EXAMPLE 6

This example illustrates the preparation of a polyether-iodine composition by contact of iodine vapor with a polyether.

100.5 grams of poly(ethylene oxide) (reduced viscosity of 8.0 at 20° C., 0.2 gram per 100 milliliters of acetonitrile), which had been passed through a standard 35-mesh per inch screen, was charged to a five-liter flask. The flask was evacuated to 2 millimeters of mercury pressure, and then 37.6 grams of iodine were vaporized from a small feed flask by heating with a lamp during a reaction period of two hours. The poly(ethylene oxide)-iodine product (137.8 grams) was blue-black in color and granular. The weight gain corresponded to 27.1 percent iodine by weight in the product.

Water solubility of the product was determined by mixing 0.4 gram with water (approximately one ounce) in a vial and rotating the mixture on can rolls for twenty-four hours. The solids were separated by centrifugation, rinsed with water and dried under reduced pressure at room temperature. The dry, black residue weighed 0.046 gram, and was acetone soluble. The melting point was 58.5° C. to 61.5° C. as determined by polarized light melting point apparatus (The Nalge Company, Rochester, New York, Model 3-H).

BIOLOGICAL TESTS (1) Effectiveness of the product against bacteria was determined using test organisms *Micrococcus Pyogenes* var. *aureus* and *Pseudomonas aeruginosa*, which were cultured on nutrient agar (pH 7.0) at 20° C. and transferred one week prior to use. Effectiveness was measured by the ability of the test compound to prevent bacterial growth when incorporated in nutrient agar. The test compound was formulated by a standard procedure of solution in acetone, addition of an emulsifier and dilution with water. To run this test at 250 p.p.m. of the product in agar, 2 milliliters of this standardly prepared 2500 p.p.m. test solution was added to 18 milliliters of agar. The agar solution had previously been prepared by completely dissolving 8 grams of Difco Bacto nutrient bronze and 15 grams Difco Bacto agar in 1000 milliliters distilled water by heating in a steam oven, and an 18 milliliter aliquot of the solution autoclaved for twenty minutes. The 2 milliliters of test solution was uniformly mixed with the 18 milliliters of molten agar solution at 50° C. to 60° C. by agitation, and then immediately poured into a sterile Petri dish. When the agar had solidified, it was ready for inoculation. The agar dish was inoculated with a transfer loop. The loop was heated until red hot, allowed to cool, gently rubbed on the surface of the bacterial colony and streaked on the agar toxicant mixture in a designated area by starting at the center of the dish and working toward the edge in a spoke-like fashion. Sterile technique was used throughout the inoculation procedure. The inoculated dish was incubated for a period of six days at a constant temperature of 20° C. The ability of the compound to inhibit growth of bacteria was visually rated according to the following designations:

5=no growth
3=moderate growth
1=severe, equal or more growth than control

Results of this test are summarized in Table III.

(2) Effectiveness of the compound against fungicides was determined using test organisms *Aspergillus oryzae* and *Penicillium piscarium* cultured on potato dextrose agar (pH 4.5–5.5) at 20° C. and transferred one to two weeks prior to use. The compound to be tested was formulated by a standard procedure of solution in acetone, addition of an emulsifier, and dilution with water. This test was run at 100 p.p.m. of the test chemical in agar by adding 2 milliliters of standardly prepared 1000 p.p.m. test solution to 18 milliliters of agar. The agar had previously been prepared by completely dissolving 45 grams of Difco potato dextrose agar and 5 grams of Difco Bacto agar in 1000 milliliters of distilled water by heating in a steam oven, and transferring 18 milliliter aliquots of the agar solution to 50-milliliter Erlenmeyer flasks and autoclaving for twenty minutes.

For each organism, a 2-milliliter aliquot of the test solution was uniformly mixed with an 18-milliliter molten sample of sterile agar at 50° C. to 60° C. by thorough agitation, and immediately poured into a sterile Petri dish. When the agar had solidified, it was ready for inoculation. An aliquot of 10 milliliters of sterilized 1 percent Tween 20 solution was poured into the test tube containing the culture of the test organism and thoroughly agitated. The surface of the colony was gently rubbed with a transfer loop previously heated until red hot and allowed to cool, and the loopful of inoculum used to inoculate the agar dish by streaking the agar-toxicant mixture in a designated area by starting at the middle of the dish and working toward the edge. The inoculated dish was incubated for five days at 20° C. The ability of the chemical to inhibit growth of the fungus was visually rated according to the following designations:

5=no growth
4=slight growth
3=moderate growth
2=heavy growth
1=severe, equal or greater growth than control Results of the tests are summarized in Table III.

(3) Effectiveness of the product against the fungus *Pythium debaryanum* was determined by pouring a standardly prepared test formulation of the compound to be tested over a cup of artificially inoculated soil and observing mycelial growth under standard conditions. The fungus was cultured on corn meal by the following method:

CORN MEAL—SAND MEDIUM

| | Ml. |
|---|---|
| Quaker brand enriched degerminated yellow corn meal | 600 |
| Washed, white playground sand | 700 |
| Deionized or distilled water | 500 |

The sand was washed with distilled water by inserting the end of a distilled water hose into a deep container and then pouring sand into the container. The sand was stirred and the water allowed to overflow so as to flush out debris. This procedure was repeated three times, and excess water decanted. The wet sand was mixed with the corn meal and the water in a shallow pan. The pan was covered with aluminum foil and autoclaved for thirty minutes at 15 p.s.i.

The cooled mixture was sliced into ¾-inch cubes, placed into 250-milliliter Erlenmeyer flasks and autoclaved for thirty minutes at 15 p.s.i. The flasks were shaken well upon removal from the autoclave in order to have as much air space as possible between the cubes. Upon cooling, the flasks were inoculated and allowed to stand one week prior to use.

Two flasks of cubes were mixed thoroughly by hand with one flat of sterile soil. The infected soil was then placed in paper cups (Dixie Cup Company, No. 143, 4 oz. squat containers—treated). (The soil may be inoculated and transferred into cups twenty-four hours prior to testing.)

A 30-milliliter aliquot of a standardly prepared test formulation of the compound was drenched onto each of two paper cups containing the infested soil (the test compound was formulated by a standard procedure of solution in acetone, addition of an emulsifier and dilution with water). This test was run at 300 pounds per acre concentration. The treated cups were incubated for two days at 70° F. and 100 percent R.H.

Following the incubation period, the amount of surface mycelial growth was visually rated according to the following designations:

5 = no growth
4 = one or two colonies
3 = surface ½ covered with colonies
2 = surface ¾ covered with colonies
1 = growth equal to control Effectiveness of the product against fungus Rhizoctonia solani in artificially inoculated soil was determined by the procedure just described except that two-week old cultures were used to infest the soil, and no attempt was made to control humidity in the incubation chamber.

Effectiveness of the product against fungus *Fusarium oxysporum lycopersici* in artificially inoculated soil was determined in the same way as for the test organism *Pythium debaryanum* with the exception that a three-week old culture was used to infect the soil, three flasks of the inoculated cubes were mixed with one flat of sterile soil prior to filling the cups, and no attempt was made to control humidity during the two-day incubation period. Results of the tests are summarized in Table III.

(4) The product was tested as a nematocide by observing its ability to inhibit galling on cucumber roots when grown in artifically contaminated soil containing the root-knot nematode *Melodogyne incognita* var. *acrita*. The roots of Rutgers variety tomato plants on which were reared the test organism were removed from the culture and chopped very finely. A small amount of this inoculum was adde to a pint mason jar containing approximately 180 cc. of composted loam soil. The jar was capped and incubated for one week at room temperature. During this period, eggs of the nematode hatch and the larval forms migrate into the soil.

The test product was formulated by a standard procedure of solution in acetone, addition of an emulsifier, and dilution with water. To simulate a toxicant concentration of approximately 375 pounds per acre, an aliquot of the test solution (25 milliliters) containing 50 mg. of the test product was added to each of two jars of contaminated soil. To simulate 75 pounds per acre, an aliquot containing 10 mg. was used. Following addition of the test chemical, the jars were capped and the contents thoroughly mixed on a ball mill for five minutes. The jars remained capped at room temperature for a period of forty-eight hours and the contents were then transferred to three-inch pots. Subsequently the pots were seeded to cucumbers as an indicator crop and placed in the greenhouse where they were cared for in the normal fashion for about three weeks. The cucumber plants were then removed from the pots, the soil washed from the roots and the amount of galling visually rated according to the following designations:

1 = severe galling, equal to untreated plants
2 = mortared galling
3 = light galling
4 = very light galling
5 = no galling; perfect control Test results are summarized in Table III.

(5) Phytotoxicity or defoliation effectiveness of the complex was determined using snap bean *Phaseolus vulgaris* var. *humilis* tendergreen with age and growth standardized by having the first trifoliate expanding. The test material was formulated by a standard procedure of solution in acetone, addition of an emulsifier and dilution with water. The test was run at 2500 p.p.m. The test plant was sprayed for thirty seconds while revolving on a turntable using a De Vilbiss type spray gun operating at 40 p.s.i. Approximately 100 to 110 milliliters of the standardized formulation was sprayed. An equal volume of water solution containing acetone and emulsifier in the same concentration as in the herbicidal mixture, but without the test herbicide, was also sprayed on a test plant to be used as a control. The plants were removed to the greenhouse and cared for in a normal manner until evaluated. Ratings were observed 7 to 9 days after application of chemical. Comparison of phytotoxicity with the untreated plant was made according to the following designations:

5 = plant dead
4 = severe injury
3 = moderate injury
2 = slight injury
1 = no injury—plant appears no different than untreated control plant Two additional test plants used for phytotoxicity studies were field corn, *Zea mays* var. *inducta*, Cornell M-4; age—6 inches tall, and tomato, *Lycopersicon esculentum*, Bonny Best; age—6 inches tall.

Test results are summarized in Table III.

(6) The product was tested as a miticide using two-spotted mites (*Tetranychus telarius*, L.) which had been reared on tendergreen beans under controlled conditions of 80±5° F. and 50±5% R.H. Infested leaves from the stock culture were placed on the primary leaves of two bean plants six to eight inches in height growing in a 2½ inch clay pot. A sufficient number of mites for testing (150–200) was transferred from the excised leaves to the fresh plants in a period of twenty-four hours, following which the excised leaves were removed from the infested plants.

The test product was formulated by a standard procedure of solution in acetone, addition of an emulsifier and dilution with water. The test was run at 2500 p.p.m. While the plants (one replicate of two plants per pot) were rotating on a revolving turntable, 100–110 milliliters of the formulated water mixture of the product was applied to the plants by use of a De Vilbiss spray gun with air pressure set at 40 p.s.i. during a period of thirty seconds. This volume of spray was sufficient to wet the plants to run-off. Water solution in the amount of 100–110 milliliters and containing acetone and emulsifier in the same concentrations as used in the insecticidal mixture but without the product being tested was also sprayed onto infested plants as a control. The sprayed plants were held at 80±5° F. and 50±5% R.H. for a period of five days when mortality of motile forms (adults and nymphs) was observed. Microscopic examination of motile forms was made on one leaf from each of the two test plants. Any individual which was capable of locomotion upon prodding was considered living. Results were rated according to the following designations:

5 = excellent control
3 = fair control
1 = poor control

Test results are summarized in Table III.

(7) Efficiency of the complex as fly bait was determined with 4 to 6 day old adult house flies (*Musca domestica*, L.) reared according to the specifications of the Chemical Specialties Manufacturing Association [Blue Book, Mac-Nair-Dorland Co., New York, pages 243–244, 261 (1945)], under controlled conditions of 80±2° F. and 50±5% R.H. The adult flies were immobilized by anesthetizing with $CO_2$. Twenty-five immobilized individuals (males and females) were then transferred to a cage consisting of a standard food strainer approximately 5 inches in diameter which was then inverted over the blotting paper containing the bait cup.

Fifteen mls. of the test formulation containing 1000 p.p.m. of the product to be tested in 10 percent sugar water was added to a souffle cup containing a one-inch square pad of Kempack. The cup containing the bait was centered on a sheet of white blotting paper measuring six inches by six inches and offered to the flies. The caged flies were allowed to feed on the bait for a period of twenty-four hours, under controlled conditions of 80±5° F. and 50±5% R.H. Flies which showed no sign of movement on prodding were considered dead. The compound was rated according to the following designations:

5=excellent control
3=fair control
1=poor control

Test results are summarized in Table III.

*Table III*

| Tests | Ratings | |
|---|---|---|
| | Iodine-poly-(ethylene oxide) (iodine charged, 27.1%) | Bromine poly-(ethylene oxide) (bromine charged, 28.1%) |
| Bacteria: | | |
| MPA | 5 | 5 |
| PA | 5 | 5 |
| Agar Inc.: | | |
| ASP | 5 | 5 |
| PEN | 5 | 5 |
| Soil: | | |
| PYTH | 5 | 5 |
| RH | 3 | 5 |
| FUS | 3 | 5 |
| Nematode, soil: | | |
| 375 lbs./acre | 3 | 1 |
| 75 lbs./acre | 1 | 4 |
| Foliage, Phyto: | | |
| BN | [1]4 | 1 |
| CN | 1 | 1 |
| TO | 1 | 1 |
| Mite, adult on foliage | 3 | 1 |
| Fly bait | 1 | 5 |

[1] With defoliation and desiccation.

EXAMPLE 7

A poly(ethylene oxide)-bromine composition was prepared by treatment of poly(ethylene oxide) resin with bromine vapors using the procedure described for iodine in Example 6. A moving bed of 400 grams of poly(ethylene oxide) resin (reduced viscosity of 8.0 at 20° C., 0.2 gram per 100 milliliters of acetonitrile) in a five-liter flask was treated with a total of 156.3 grams of bromine vapor at room temperature to produce a bright orange granular product weighing 556.1 grams. The weight gain corresponded to 28.1 percent by weight total bromine in the reaction product. Water extraction of the product performed as described in the previous example yielded a light yellow solution and an insoluble residue amounting to 2.9 percent by weight of the product. In more dilute solutions the product was completely water-soluble. A 5 percent by weight solution of the product in water was insufficiently viscous to obtain a Brookfield viscosity at 25° C. in the normal manner. The melting point (polarized light) was 45° C. to 47° C. and the bulk flow temperature was 36.6° C.

Biological evaluations were performed according to the above-described procedures, and the results of the tests are summarized in Table III.

EXAMPLE 8

A poly(ethylene oxide)-bromine composition containing 14.1 percent bromine was prepared by treating 850 grams of powdered poly(ethylene oxide) (reduced viscosity of 25 at 20° C., 0.1 gram per 100 milliliters of water) with 156 grams of bromine vapors by a procedure similar to that described hereinabove.

Good flow-out was observed when a sample of the product was molded at room temperature using 5000 p.s.i. to mold a four-inch diameter hard plaque.

A bright clear orange solution containing no sediment was obtained when the solid bromine-containing product was dissolved in water at a 2.5 percent by weight concentration. The pH value of the solution was 2.25. The product was found by analysis to contain 14.1 percent total bromine, 8.35 percent available bromine, and 4.85 percent bromide ion. A 5 percent by weight aqueous solution of the product was prepared and the Brookfield viscosity was observed to be 16 centipoises at room temperature employing spindle No. 1 at 20 r.p.m.

Vapor pressures of the bromine reaction product at various temperatures, in comparison to literature values for pure bromine, are as follows:

| Temp., °C. | Vapor pressure, elemental bromine | Millimeters of mercury, poly(ethylene oxide)-bromine composition |
|---|---|---|
| 20 | 173 | 1.3 |
| 30 | 264 | 2.3 |
| 40 | 392 | 3.9 |
| 50 | 564 | 6.3 |
| 60 | 793 | 10.1 |

EXAMPLE 9

A series of five aqueous solutions were prepared containing both poly(ethylene oxide)-iodine and poly(ethylene oxide)-bromine compositions in various ratios. The aqueous solutions contained a weight of 5 grams of poly(ethylene oxide)-iodine composition (8.14 percent by weight total iodine) together with a varying amount of 1 to 5 grams of the poly(ethylene oxide)-bromine composition (14.1 percent by weight total bromine), dissolved together in each case in 95 grams of distilled water.

The solutions containing 1 and 2 grams of poly(ethylene oxide)-bromine composition, respectively, were dark brown and contained some suspended solids. The solution containing 3 grams of poly(ethylene oxide)-bromine composition was dark amber and contained a lesser amount of suspended solids. The solution containing 4 grams of poly(ethylene oxide)-bromine composition was medium amber and contained a small amount of suspended solids, and the solution containing 5 grams of poly(ethylene oxide)-bromine composition was orange colored and contained no suspended solids. The method of preparing the solutions consisted of rolling the mixtures for three hours on can rolls, heating in a steam bath for five minutes and rolling for an additional three hours.

The results showed that mixtures of poly(ethylene oxide)-iodine and poly(ethylene oxide)-bromine compositions containing 65 percent by weight bromine based on total halogen content formed clear solutions in water, and that solutions containing 60 percent bromine or less will contain increasing amounts of water-insoluble fractions if originally present in the poly(ethylene oxide)-iodine compositions. These solutions were more stable than those containing only the poly(ethylene oxide)-bromine products as indicated by the persistence of the halogen color in the solution at its original density for several days, in contrast to noticeable decrease in color intensity for solutions containing only the poly(ethylene oxide)-bromine compositions.

Similar results are obtained when poly(propylene oxide), poly(ethylene oxide-propylene oxide), and poly(propylene oxide-1,2-butylene oxide) are employed in the same manner as demonstrated with poly(ethylene oxide).

EXAMPLE 10

A hydroxyethylcellulose-iodine composition was prepared in the identical manner as Example 2 by a substitution of hydroxyethylcellulose for the poly(ethylene oxide) previously used. The hydroxyethylcellulose employed was "Cellosize WP-300" (Union Carbide Chemicals Company), which had a 2 percent by weight aqueous solution viscosity in the range of 225 to 325 centipoises at 20° C. as determined with a Precision Model Hoeppler viscometer. The dried product was a dark red powder weighing 10.5 grams and having an analysis of 11.9 percent total iodine, 6.6 percent available iodine, and 5.1 percent iodide ion.

EXAMPLE 11

This example illustrates the preparation of a poly(ethylene oxide-propylene oxide)-iodine composition.

The polyether resin component was prepared by copolymerization under autogenous pressure of 25 parts of ethylene oxide with 6.25 parts of propylene oxide to near 100 percent conversion at 90° C. for sixty-eight hours, using 0.22 part of dibutyl zinc as catalyst. The white, solid product, after purification by dissolving in toluene, precipitating by addition of hexane, and drying at 30° C. in a vacuum oven had a reduced viscosity of 6.04 (30° C., 0.200 gram per 100 milliliters acetonitrile).

20 grams of this copolymer and 5 grams of elemental iodine were mixed overnight with 125 grams of n-heptane on can rolls. The product, after removal of the excess iodine-heptane solution by decantation, and drying at 25° C. in a vacuum oven for forty-eight hours was a nearly black solid of grease-like consistency. It was water-soluble at 0.5 percent by weight solids concentration, but insoluble (although dispersible) at a 3 percent by weight solids concentration. Analysis of the product showed its halogen content to be 4.30 percent iodide ion and 6.36 percent available iodine.

What is claimed is:

1. A biologically active composition comprising (1) resinous poly(alkylene oxide) having a molecular weight between about twenty thousand and ten million, said poly(alkylene oxide) being prepared from a monomeric 1,2-alkylene oxide containing from 2 to 4 carbon atoms, inclusive, and (2) between about 5 and 300 percent by weight, based on the weight of poly(alkylene oxide) of halogen selected from the group consisting of iodine and bromine.

2. A biologically active composition comprising (1) resinous poly(alkylene oxide) having a molecular weight between about twenty thousand and ten million, said poly(alkylene oxide) being prepared from a monomeric 1,2-alkylene oxide containing from 2 to 4 carbon atoms, inclusive, and (2) between about 1 and 250 percent by weight, based on the weight of poly(alkylene oxide), of molecular halogen selected from the group consisting of iodine and bromine.

3. A biologically active composition comprising (1) resinous poly(alkylene oxide) having a molecular weight between about twenty thousand and ten million, said poly(alkylene oxide) being prepared from a monomeric 1,2-alkylene oxide containing from 2 to 4 carbon atoms, inclusive, and (2) between about 1 and 250 percent by weight, based on the weight of poly(alkylene oxide), of molecular iodine.

4. A biologically active composition comprising (1) resinous poly(alkylene oxide) having a molecular weight between about twenty thousand and ten million, said poly(alkylene oxide) being prepared from a monomeric 1,2-alkylene oxide containing from 2 to 4 carbon atoms, inclusive, and (2) between about 1 and 250 percent by weight, based on the weight of poly(alkylene oxide), of molecular bromine.

5. A liquid biologically active composition comprising (1) resinous poly(ethylene oxide) having a molecular weight between about twenty thousand and ten million, and (2) between about 50 and 300 percent by weight, based on the weight of poly(ethylene oxide), of bromine.

6. An aqueous germicidal solution having dissolved therein a composition comprising (1) resinous poly(ethylene oxide) having a molecular weight between about twenty thousand and ten million, and (2) between about 5 and 300 percent by weight, based on the weight of poly(ethylene oxide), of bromine.

7. An aqueous germicidal solution having dissolved therein a composition comprising (1) resinous poly(ethylene oxide) having a molecular weight between about twenty thousand and ten million, and (2) between about 5 and 300 percent by weight, based on the weight of poly(ethylene oxide), of iodine.

References Cited in the file of this patent

UNITED STATES PATENTS

| 2,840,510 | Katz | June 24, 1958 |
| 2,868,686 | Shelanski | Jan. 13, 1959 |
| 2,831,777 | Shelanski | Apr. 5, 1960 |
| 2,982,742 | Smith | May 2, 1961 |

OTHER REFERENCES

Carbowax Polyethylene Glycols, Union Carbide Chem. Co. publication, 1958, pp. 23, 24.

Polyethylene Glycol Esters, Kessler Chem. Corp. publication, 1948, p. 24.